United States Patent
Peng

(10) Patent No.: US 6,631,163 B1
(45) Date of Patent: Oct. 7, 2003

(54) DYNAMIC ADAPTATION OF COMPLEXITY IN AN MPEG-2 SCALABLE DECODER

(75) Inventor: Shaomin Peng, Yorktown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 478 days.

(21) Appl. No.: 09/712,678

(22) Filed: Nov. 14, 2000

(51) Int. Cl.[7] .............................................. H04N 7/12
(52) U.S. Cl. ................................................ 375/240.25
(58) Field of Search .................. 375/240.25, 240.12, 375/240.03, 240.2, 240.15, 240.16, 240.24; 348/409.1, 416.1, 420.1, 390.1, 725; 382/233, 238, 236; 386/109, 111; 358/261.3, 427, 430

(56) References Cited

U.S. PATENT DOCUMENTS

| | | | | |
|---|---|---|---|---|
| 5,278,646 A | * | 1/1994 | Civanlar et al. | 375/240.25 |
| 5,418,568 A | * | 5/1995 | Keith | 375/240.25 |
| 5,751,888 A | * | 5/1998 | Fukuchi et al. | 386/68 |
| 5,812,699 A | * | 9/1998 | Zhu et al. | 382/232 |
| 5,832,234 A | * | 11/1998 | Iverson et al. | 709/247 |
| 5,903,311 A | * | 5/1999 | Ozcelik et al. | 375/240.2 |
| 6,233,277 B1 | * | 5/2001 | Ozcelik et al. | 375/240.02 |
| 6,243,421 B1 | * | 6/2001 | Nakajima et al. | 375/240.25 |
| 6,539,059 B1 | * | 3/2003 | Sriram et al. | 375/240.25 |
| 2001/0055339 A1 | * | 12/2001 | Choi | 375/240.21 |
| 2002/0009145 A1 | * | 1/2002 | Natarajan et al. | 375/240.21 |

OTHER PUBLICATIONS

Vetro et al., "Minimum drift architectures for 3–layer scalable DTV decoding", IEEE Transactions on Consumer Electronics, vol. 44, iss. 3, pp. 527–536, Aug. 1998.*

Iwahashi et al., "Design of motion compensation filters of frequency scalable coding–drift reduction", IEEE International Symposium on Circuits and Systems, vol. 3, pp. 277–280, Jun. 1994.*

Yanagihara et al., "Scalable video decoder and its application to multi–channel multicast system", IEEE Transactions on Consumer Electronics, vol. 46, iss. 3, pp. 866–871, Aug. 2000.*

Bilas et al., "Real–time parallel MPEG–2 decoding in software", 11th International Proceedings, Parallel Processing Symposium pp. 197–203, Apr. 1997.*

Van der Schaar et al., "Near–lossless complexity–scalable embedded compression algorithm for cost reduction in DTV receivers", IEEE Transactions on Consumer Electronics, vol. 46, iss. 4, pp. 923–933, Nov. 2000.*

Bilas et al., "Real–time parallel MPEG–2 decoding in software", IEEE, 11th International Symposium on Parallel Processing, pp 197–203, Apr. 1997.*

Yokoyama, Y., "Adaptive GOP structure selection for real–time MPEG–2 video encoding", IEEE, Internationa Conference on Image Processing, vol. 2, pp. 832–835, Sep. 2000.*

* cited by examiner

Primary Examiner—Vu Le
(74) Attorney, Agent, or Firm—Russell Gross

(57) ABSTRACT

A system and method for dynamically setting a complexity level for a scalable module in a video decoder. The method comprises the steps of: decoding a first GOP using an initial threshold value; determining an adjusted threshold value for the first GOP; and decoding a second GOP using the adjusted threshold value calculated for the first GOP. A calculation system is similarly disclosed that determines a threshold value for a current GOP based on a previously decoded GOP by iteratively selecting different threshold values until a scaled complexity of the decoder system for a previous GOP substantially meets a required complexity of the video decoder system for the current GOP.

16 Claims, 3 Drawing Sheets

DYNAMIC ADAPTATION OF COMPLEXITY IN AN MPEG-2 SCALABLE DECODER

CROSS-REFERENCE TO RELATED APPLICATION

This application is related to U.S. patent application Ser. No. 09/709,260, filed on Nov. 9, 2000, entitled "SCALABLE MPEG-2 VIDEO DECODER", which is commonly assigned with the present application and hereby incorporated by reference.

BACKGROUND OF THE INVENTION

1. Technical Field

The present invention relates to decoding compressed video signals, and more particularly relates to a system and method for dynamically adapting the complexity of a scaled MPEG-2 video decoder.

2. Related Art

The MPEG standards are an evolving set of standards for video and audio compression developed by the Moving Picture Experts Group (MPEG). MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems.

According to the MPEG-2 standard, an MPEG-2 sequence is divided into a series of GOPs (Group Of Pictures). There are three different types of pictures, with each being essentially a frame of pixels. Each GOP begins with an Intra-coded picture (I picture) followed by an arrangement of forward Predictive-coded pictures (P pictures) and Bi-directionally predictive-coded pictures (B pictures). I pictures are fields or frames coded as a stand-alone still image. P pictures are fields or frames coded relative to the nearest I or P picture, resulting in forward prediction processing. P pictures allow more compression than I pictures through the use of motion compensation, and also serve as a reference for B pictures and future P pictures. B pictures are fields or frames that use the most proximate past and future I and P picture as a reference, resulting in bi-directional prediction.

As the digital TV market gradually begins to dominate the TV market and other video applications become more desirable, the demand for systems having advanced capabilities for processing MPEG-2 pictures becomes stronger and stronger. The current emerging architecture for processing MPEG-2 data, such as that found in DTV set-top boxes and high end digital TV's, typically utilize a combination of a digital signal processing central processing units (DSPCPU), control processors, coprocessors, and software applications. Unfortunately, even with all these resources, advanced audio/visual processing functions tend to consume more computational power than is often available.

One of the key elements in MPEG-2 processing is the MPEG-2 decoder, which converts a bitstream of compressed MPEG-2 data into pixel images. The main components of a generic MPEG-2 decoder 11 are shown in FIG. 1. There are four functional blocks: the variable length decoder (VLD) 13, inverse quantization (IQ) 15, inverse discrete cosine transform (IDCT) 17, and the motion compensation (MC) 19. Memory 21 is used to store the reference frames. The adder combines the error residuals output from IDCT 17 (path 1) with motion compensation results (path 2) to form the final video output. Unfortunately, each of these functional components consume a tremendous amount of computational power, which drives up the cost, and limits the flexibility of digital video systems using MPEG-2 technology. Accordingly, making a highly efficient, cost effective decoder remains one of the main goals of all electronics manufacturers.

One solution for addressing the processing requirements of MPEG-2 decoders is to provide specialized hardware systems that increase computational power. For example, U.S. Pat. No. 5,903,311, issued to Ozcelik et al. on May 11, 1999, which is hereby incorporated by reference, describes a chip that includes specialized circuits for an MPEG-2 decoder. Unfortunately, while overall hardware costs continue to decrease, the costs involved in designing and building specialized hardware such as this greatly drive up the expense of the decoder.

A preferred solution therefore is to implement as much functionality as possible in software, which provides significant cost and flexibility advantages over hardware solutions. In particular, software solutions reduce the need for expensive hardware, such as coprocessors, and will allow multiple video functions to run concurrently on a DSPCPU core. However, software applications tend to run too slow to handle occasions when computationally intensive decoding operations are required. Accordingly, a need exists for enhanced systems that can provide inexpensive MPEG-2 decoder solutions while maintaining an acceptable level of video quality.

SUMMARY OF THE INVENTION

This invention overcomes the above-mentioned problems, as well as others, by providing a scalable decoder system. In a first aspect, the invention provides a method for setting a threshold value for a scalable module in a video decoder, comprising the steps of: (1) decoding a first group of pictures (GOP) using an initial threshold value; (2) determining an adjusted threshold value based on the first GOP; and (3) decoding a second GOP using the adjusted threshold value.

In a second aspect, the invention provides a scalable video decoder system, comprising: a calculating system that determines an adjusted threshold value based on a previously decoded group of pictures (GOP); and a scalable module that decodes a current GOP using the adjusted threshold value.

In a third aspect, the invention provides a program product stored on a recordable media, that when executed, dynamically selects a threshold value for a scalable video decoder system, and comprises a system that determines the threshold value for a current group of pictures (GOP) based on a previously decoded GOP by iteratively selecting different threshold values until a scaled complexity of the decoder system for the previous GOP substantially meets a required complexity of the video decoder system for the current GOP.

It is therefore an advantage of the present invention to provide a system and method for dynamically setting a threshold value for a scalable module within a video decoder system.

It is therefore a further advantage to provide a scalable system that does not need to preset the threshold, and can dynamically set a scaled complexity based on the required complexity as determined by the system.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

Figure 1:
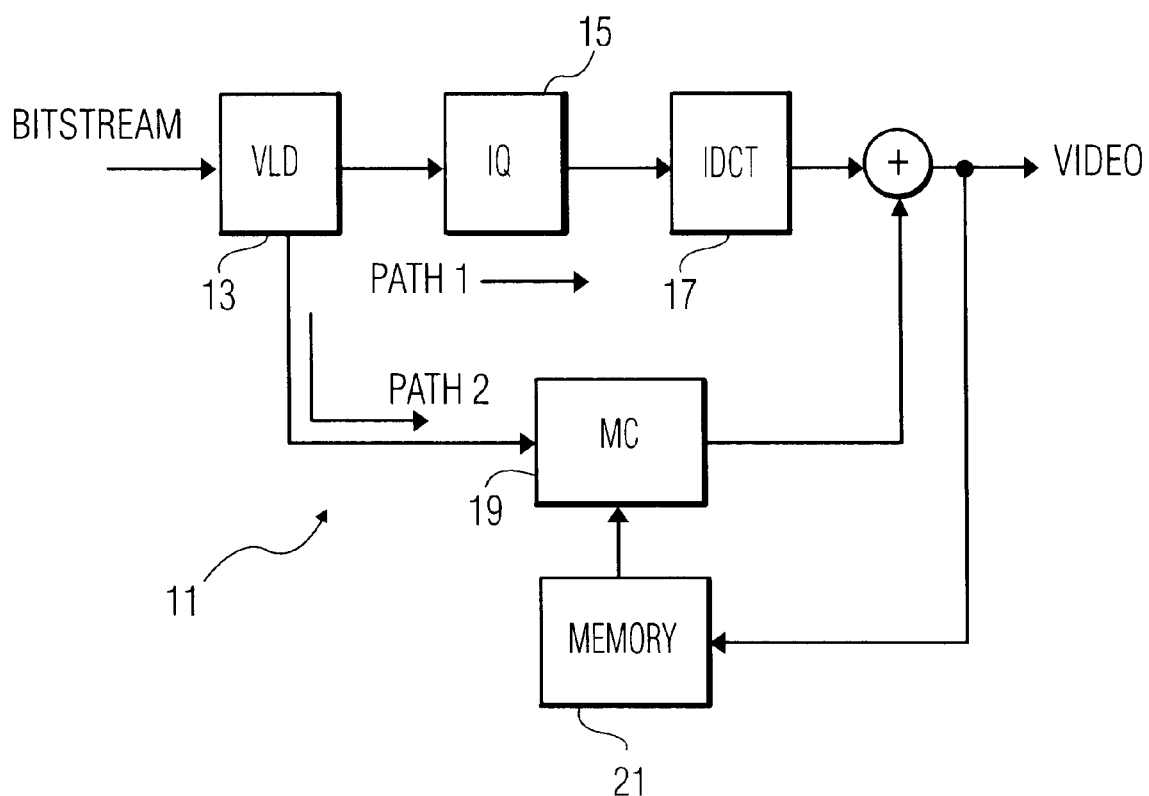
FIG. 1 depicts a block diagram of a generic decoder.
Figure 2:
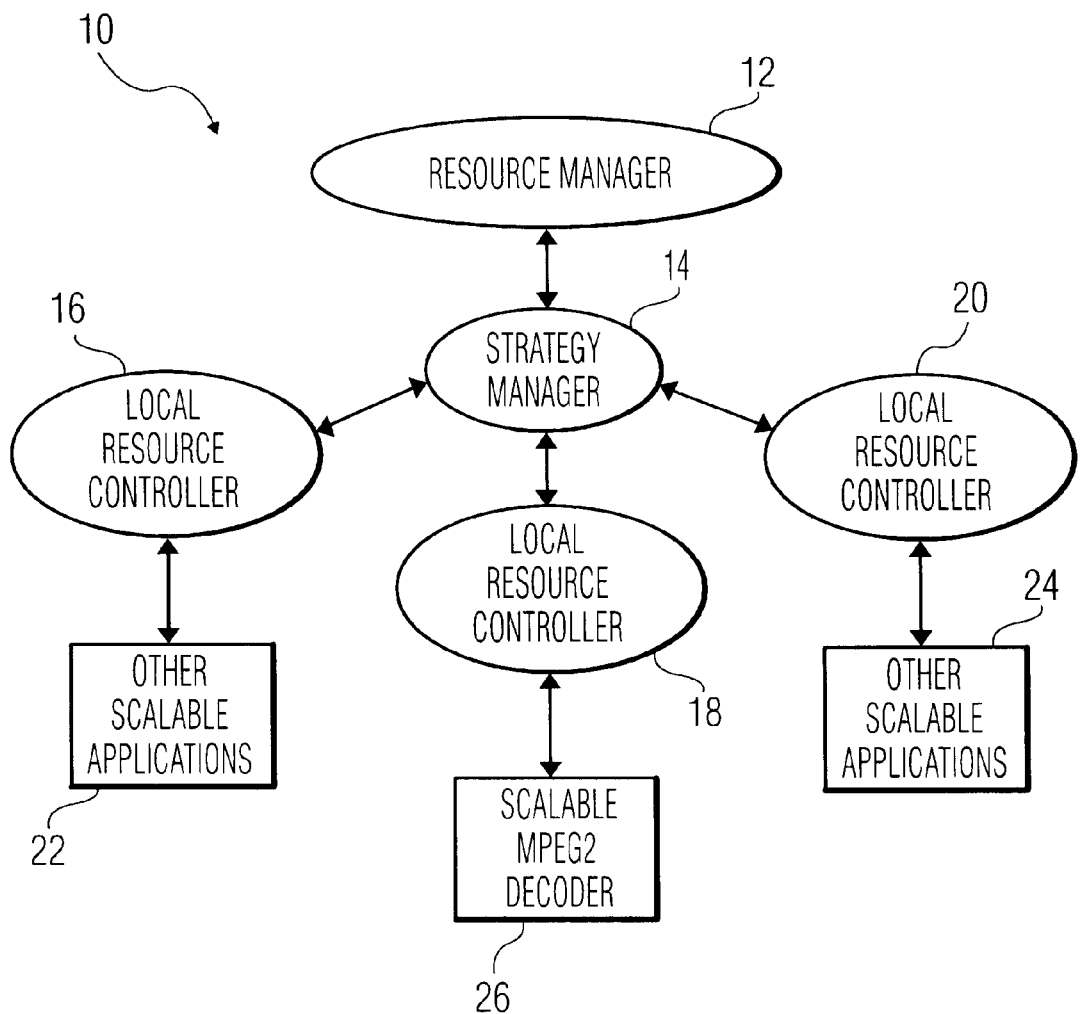
FIG. 2 depicts a functional diagram of a resource allocation system in accordance with a preferred embodiment of the present invention.

Referring to FIG. 2, a scalable video application system 10 is shown. As detailed in related patent application "SCALABLE MPEG-2 VIDEO DECODER," scalable applications provide mechanisms that allow computationally intensive video systems to operate more efficiently without significantly sacrificing output quality. For instance, such systems may comprise algorithms that selectively eliminate processing steps in order to save computational power.

Figure 3:
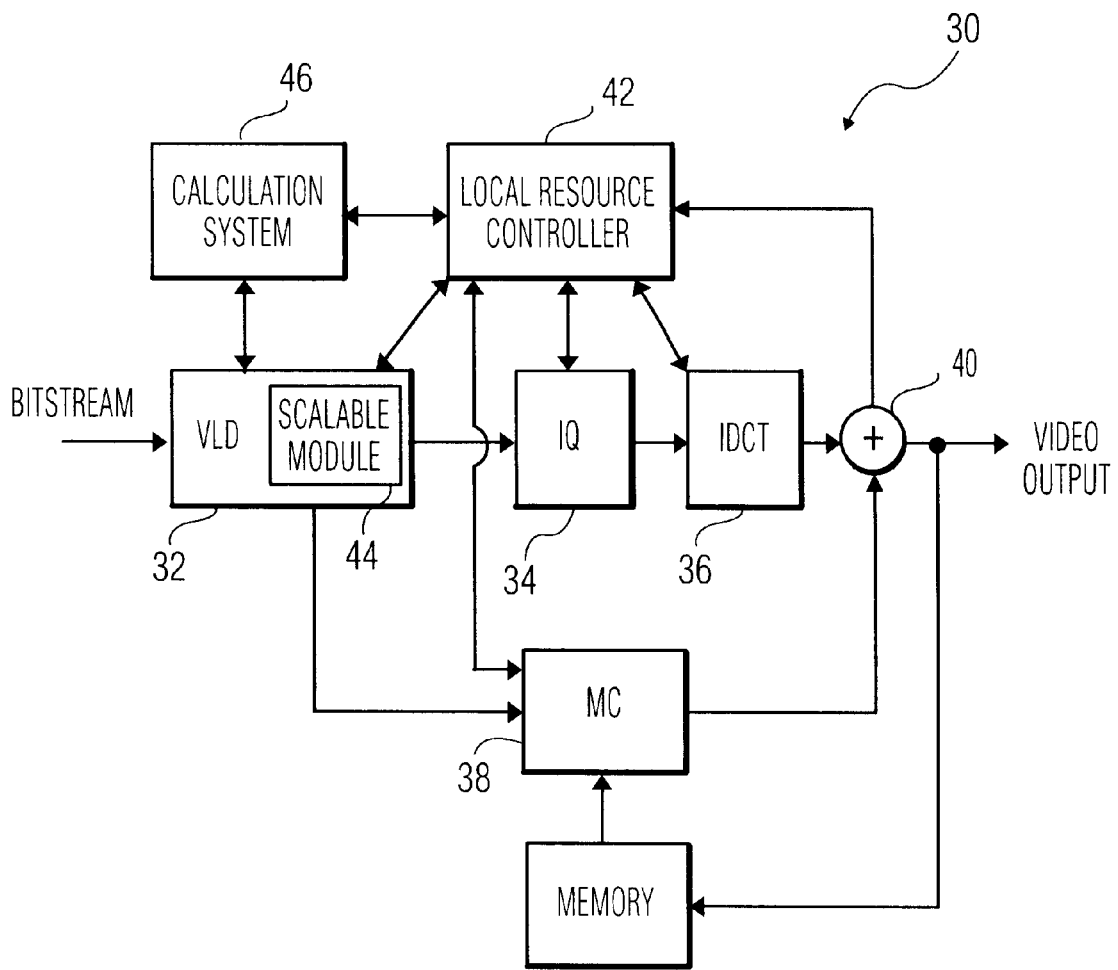
FIG. 3 depicts a functional diagram video decoder in accordance with a preferred embodiment of the present invention.

Scalable video system 10 comprises a resource manager 12; a strategy manager 14; local resource controllers 16, 18, 20; and scalable applications 22, 24, 26 ("applications"). The relationships of these components are described as follows with reference to FIG. 2. Resource manager 12 oversees the overall resource usage of the whole system. Resource manager communicates control commands to strategy manager 14 when resources vary, and receives feedback from the strategy manager when applications are scaled. The strategy manager 14 serves as an envoy for resource manager 12, and has the power to command the local resource controllers 16, 18, 20 to scale their applications to adapt to changing resource levels. In the preferred embodiment, the scalable application will be described in the context of an MPEG-2 decoder 30, as depicted in FIG. 3. However, it should be understood that the features and advantages of this invention could be applied to other scalable applications 22, 24, including, but not limited to, a video encoder.

Although the strategy manager 14 controls the overall scaling levels of different applications, it does not control the detail of the scalability of each specific application. For example, strategy manager 14 controls the total complexity level allocated to MPEG-2 decoder 26, but it does not control which functional block of MPEG-2 decoder 26 should be scaled down and to what level. This is the function of the local resource controller 18. Local resource controller 18 determines exactly how each functional block inside of the MPEG-2 decoder 26 is scaled and to what level. Ultimately, a scalable application or algorithm is the mechanism that fulfills the scalability job.

When strategy manager 14 informs local resource controller 18 that the complexity level of MPEG-2 decoder 26 needs to be changed, the local resource controller 18 will divide the resources locally to each of the scalable functional blocks inside the MPEG-2 decoder. One such method for scaling resources in a decoder is described in related patent application Ser. No. 09/709,260, "SCALABLE MPEG-2 VIDEO DECODER," (hereinafter "exemplary scaling application").

In the exemplary scaling application, a scaled B frame processing method for a scalable MPEG-2 video decoder is proposed. This method considers one group of pictures (GOP) of an MPEG-2 sequence as a complexity scalable unit. Inside each GOP, the computation of B frames is scaled according to the level of resources availability. Compared to I and P frames, B frames do not carry prediction drift. Therefore, reducing the computational load for calculating B frames will benefit other applications without causing prediction drift to be accumulated. In particular, it is recognized that in most cases, when the motion is not too fast, the residual error is usually small and totally discarding it will not degrade the image quality severely. However, when fast motion exists and the prediction error is large, discarding the B frame residual could significantly degrade the video output.

A scaling application is thus provided to selectively decode only those B blocks (i.e., active B blocks) that meet a certain threshold, and to discard the computation of those B blocks (i.e., in-active B blocks) that do not meet the threshold. Accordingly, when the threshold is set low, more B blocks are decoded, fewer resources are saved, and the output quality is better. Alternatively, when the threshold is set high, less B blocks are decoded, more resource are saved, and the output is more degraded. While the exemplary scaling application provides a method of B frame scalability, it does not provide a scheme to dynamically adapt to changing resource levels and to fluctuating input data that occur in a system such as that depicted in FIG. 2. This invention provides such a system. It should be understood that while this invention is described with reference to a B frame scaling application, it should be appreciated that this invention can be applied to any scaling application in which the allocation of system resources fluctuate.

The complexity for a generic MPEG-2 decoder is defined as the average complexity of a complete GOP. The relationship of the GOP complexity and the number of B blocks involved is $$C_s = 1 - \frac{N_B}{N_{I+P+B}}(1-\gamma)(C_{IQ+IDCT} + C_{adder}),$$

Where $N_B$ is the total number of B blocks inside one GOP, $N_{I+P+B}$ is the number of blocks in one GOP; $C_{IQ+IDCT} + C_{adder}$ is the total complexity of the IQ, IDCT and adder functions in one GOP; $\gamma$ is the percentage of the kept B blocks of the scaled B frame scheme. Let $$C_0 = \frac{N_B}{N_{I+P+B}}(C_{IQ+IDCT} + C_{adder}).$$

Then $$C_s = 1-(1-\gamma)C_0.$$

Or $$C_s = (1-C_0)+\gamma C_0.$$

It is clear that the variation of $\gamma$ will vary the total complexity of the decoder. Since $\gamma$ is dictated by the selected threshold, a correlation between the selected threshold and the resulting complexity can be readily established for a given GOP. Thus, the complexity of the decoder can be scaled by identifying an appropriate threshold level that will meet the complexity requirements.

However, calculating the complexity of the decoder for a current GOP is dependent on the data contained within the current GOP. Performing such a calculation in real-time for the decoding operation of the current GOP is too computationally intensive for a system subject to resource constraints. Thus, for systems seeking to reduce computational overhead, selecting a scaled complexity level for the current decoding operation based on a current GOP is impractical. To overcome this limitation, the present embodiment examines the complexity level of a prior decoding operation to iteratively arrive at a properly scaled complexity level for a current decoding operation.

As described above, a typical scalable application comprises some threshold level or value that determines if and when the application should be scaled back. In order to provide for varying resource levels, the present embodiment provides an array, or set of thresholds, which can track different complexity level requirements. The array of thresholds is represented as:

threshold_array=[val_1, val_2, . . . val_p],

Where p is an integer and val_1, val_2, . . . val_p may be selected, for example, based on experimental results, and may cover any range of threshold values deemed necessary. In this embodiment, the number of threshold values p is preferably set in an ascending order. Smaller values in the array correspond to higher complexity.

For the first decoding operation, an initial threshold is chosen from the threshold_array. Subsequent decoding operations will utilize an adjusted threshold value, which is chosen from the threshold_array in a manner described herein. In general, if the required complexity of an application is lower than the scaled complexity calculated with the initial threshold setting, the initial threshold is adjusted higher by selecting the next value in the threshold_array. Alternatively, if the required complexity is calculated to be higher than the scaled complexity, the initial threshold is adjusted lower. Moreover, to attain an acceptable scaled complexity level, a few iterations may be required before a stable value is obtained.

Calculating complexities and selecting threshold values can be done in the following manner. For the purposes of this embodiment, assume there are a total of K GOPs and the transient time for the decoder from one complexity level to the other with the scaled B frame method is $\alpha$ GOPs ($\alpha \leq K$). Also assume that the initial value of threshold $\lambda$ is $$\lambda = val\_\psi_0,$$

where $$val\_1 \leq val\_\psi_0 \leq val\_p.$$

First, the decoder is run with the initial threshold $\lambda$ for a first GOP, denoted as $GOP\_\psi_{\xi-1}$, where $1 \leq \xi \leq \alpha$.

A second GOP is then inputted, i.e., $GOP\_\psi_\xi$. At the beginning of $GOP\_\psi_\xi$ (e.g., in the I frame), a ratio $\gamma_{\xi-1}$ is calculated for the previous GOP, $GOP\_\psi_{\xi-1}$ using $$\gamma_{\xi-1} = \frac{\zeta_{B\_active\_(\xi-1)}}{\zeta_{B\_total\_(\xi-1)}},$$

where $\zeta_{B\_active\_(\xi-1)}$ represents the total number of active B blocks in the previous GOP (e.g., those blocks that have a DC value higher than the threshold value) and $\zeta_{B\_total\_(\xi-1)}$ represents the total number of B blocks in the previous GOP.

With the result of $\gamma_{\xi-1}$, the scaled complexity $C_{s\_\psi_{\xi-1}}$ is calculated through the above given relation of $C_s$ and $\gamma$. The scaled complexity $C_{s\_\psi_{\xi-1}}$ is then compared to the required complexity, which is set by an external source, such as the local resource controller. There are three possible outcomes to consider: (1) If $C_{s\_\psi_{\xi-1}}$ is equal to, or slightly less than the required complexity, the threshold value $\lambda$ is kept and the current $GOP\_\psi_\xi$ is decoded. (2) If $C_{s\_\psi_{\xi-1}}$ is higher than the required complexity, the next higher threshold value in the threshold_array is selected. The scaled complexity $C_{s\_\psi_{\xi-1}}$ is then recalculated and again compared to the required complexity. (3) If $C_{s\_\psi_{\xi-1}}$ is lower than the required complexity, the next lower threshold value in the threshold_array is selected. The scaled complexity $C_{s\_\psi_{\xi-1}}$ is then recalculated and again compared to the required complexity. Results (2) and (3) are repeated until the scaled complexity substantially meets the required complexity (i.e., until the scaled complexity is equal to, or slightly less than the required complexity). It should be appreciated that the determining factor of when the scaled complexity "substantially meets" the required complexity can vary depending on the particular implementation. For example, a scaled complexity of 95–100% of the required complexity could be set as the determining factor.

Referring now to FIG. 3, a scalable MPEG-2 video decoder 30 is depicted. Decoder 30 includes a variable length decoder (VLD) block 32, and inverse quantization (IQ) block 34, an inverse discrete cosine transform (IDCT) block 36, an adder 40, and a motion compensation (MC) block 38. In addition, decoder 30 includes a local resource controller 42 (as described above) that receives instructions from a resource manager/strategy manager (not shown) regarding the availability of resources allocated to decoder 30. Local resource controller 42 is responsible for scaling the complexity of decoder 30 up or down to the necessary level. Local resource controller 42 therefore sets the "required complexity" of the decoder, which is used for the threshold determination scheme described above.

In the embodiment depicted in FIG. 3, decoder 30 is shown with a scalable module 44 residing in VLD 32. Scalable module 44 may comprise the B frame scalable algorithm described above, or any other type of scalable application. It should also be understood that the scalable module 44 need not reside in VLD 32, but could reside within other components of decoder 30 or within another scalable system.

Also shown in FIG. 3 is calculation system 46. Although calculation system 46 is shown residing separately from the other components in decoder 30, it is understood that it could be incorporated into local resource controller 42, into the scalable module 44, or into the particular component being scaled (e.g., VLD). Calculation system 46 is responsible for calculating the proper threshold for scalable module 44 for a current group of pictures about to be processed. In the preferred embodiment described herein, the threshold value is calculated by iteratively selecting new threshold values until a scaled complexity of the decoder system for the previously decoded GOP substantially meets a required complexity of the video decoder system for the current GOP. As detailed above, the iterative process includes: (1) determining a scaled complexity of the video decoder processed with a predetermined threshold value; (2) comparing the scaled complexity to a required complexity; and (3) substituting the predetermined threshold value with a new threshold value if the scaled complexity does not substantially meet the required complexity. Accordingly, calculation system 46 dynamically calculates the threshold value for a current GOP based on the complexity of a previously decoded GOP. By providing such a system, the overall complexity of decoder 30 remains as robust as possible, even though the inputted data and resource requirements vary.

It is understood that systems and modules described herein, including calculation system 46 can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims. For instance, although the description provided herein generally relates to MPEG-2 decoders, it is understood that the invention can be applied to any scalable system including an encoder.

We claim:

1. A method for dynamically setting a threshold value for a scalable module in a video decoder, comprising the steps of:

decoding a first group of pictures (GOP) using an initial threshold value;

determining an adjusted threshold value based on the first GOP; and decoding a second GOP using the adjusted threshold value.

2. The method of claim 1, wherein the calculating step includes the steps of:

determining a scaled complexity of the video decoder processed with the initial threshold value;

comparing the scaled complexity to a required complexity; and substituting the initial threshold value with the adjusted threshold value if the scaled complexity does not substantially meet the required complexity.

3. The method of claim 2, wherein the determining, comparing, and substituting steps are iteratively repeated until the scaled complexity substantially meets the required complexity.

4. The method of claim 3, wherein each threshold value is selected from among a set of predetermined threshold values.

5. The method of claim 2, wherein the scaled complexity ($C_s$) of the video decoder is calculated by:

$$C_s = 1 - \frac{N_B}{N_{I+P+B}}(1-\gamma)(C_{IQ+IDCT} + C_{adder}),$$

where $N_B$ is the number of B blocks in the GOP, $N_{I+P+B}$ is a total number of frames in the GOP, $\gamma$ is the ratio of B blocks kept in the decoding process relative to the total B blocks in the GOP, and $C_{IQ+IDCT}+C_{adder}$ is a total combined complexity of an IQ, IDCT, and ADDER functions within the decoder.

6. The method of claim 5, wherein the ratio of B blocks kept in the decoding process ($\gamma$) is a function of a selected threshold value.

7. The method of claim 6, wherein the selected threshold value is inversely proportional to the scaled complexity.

8. The method of claim 5, wherein the required complexity is determined by a resource manager.

9. A scalable video decoder system, comprising:

a calculating system that determines an adjusted threshold value based on a previously decoded group of pictures (GOP); and a scalable module that decodes a current GOP based on the adjusted threshold value.

10. The video decoder system of claim 9, wherein the calculating system iteratively selects new adjusted threshold values until a scaled complexity of the decoder system for the previously decoded GOP substantially meets a required complexity of the video decoder system for the current GOP.

11. The video decoder of claim 10, further comprising a local resource controller that sets the required complexity for the current GOP.

12. The video decoder system of claim 9, wherein the calculated adjusted threshold value is selected from a set of predetermined threshold values.

13. The video decoder system of claim 9, wherein the scalable module comprises a system for skipping the processing of certain B blocks in the GOP based on the determined adjusted threshold value.

14. The video system of claim 13, wherein the scaled complexity ($C_s$) of the decoder is calculated by:

$$C_s = 1 - \frac{N_B}{N_{I+P+B}}(1-\gamma)(C_{IQ+IDCT} + C_{adder}),$$

where $N_B$ is the number of B frames in the previous GOP, $N_{I+P+B}$ is a total number of blocks in the previous GOP, $\gamma$ is the ratio of B blocks kept in the decoding process in based on the adjusted threshold value, and $C_{IQ+IDCT}+C_{adder}$ is the total combined complexity of an IQ, IDCT, and ADDER functions within the decoder.

15. A program product stored on a recordable media, that when executed, dynamically selects a threshold value for a scalable video decoder system, and comprises:

a system that determines the threshold value for a current group of pictures (GOP) based on a previously decoded GOP by iteratively selecting different threshold values until a scaled complexity of the decoder system for a previous GOP substantially meets a required complexity of the video decoder system for the current GOP.

16. The program product of claim 15, wherein each threshold value is selected from a predetermined set of threshold values.

* * * * *